May 30, 1944.　　　E. E. WEMP　　　2,349,921
TORQUE REACTION DEVICE
Filed May 26, 1941　　　7 Sheets-Sheet 1

Fig. 1

INVENTOR.
Ernest E. Wemp
BY Barnes, Kisselle, Laughlin & Raisch
Attorneys.

May 30, 1944.　　　　E. E. WEMP　　　　2,349,921
TORQUE REACTION DEVICE
Filed May 26, 1941　　　7 Sheets-Sheet 3

INVENTOR.
Ernest E. Wemp
BY
Barnes, Kisselle, Laughlin & Raisch
Attorneys.

INVENTOR.
Ernest E. Wemp
BY
Barnes, Kisselle, Laughlin & Reisch
Attorneys.

Patented May 30, 1944

2,349,921

UNITED STATES PATENT OFFICE 2,349,921

TORQUE REACTION DEVICE

Ernest E. Wemp, Detroit, Mich.

Application May 26, 1941, Serial No. 395,139

14 Claims. (Cl. 188—90)

This invention relates to a rotary torque reaction device wherein the reaction is supplied by fluid means.

It is an aim of the invention to provide a rotary torque reaction device of relatively high efficiency in that the reaction to an applied torque is high while the energy wasted or expended in the form of heat or the like is relatively low. The device may be used as an absorption dynamometer. The mechanism is arranged to store potential energy in a fluid, and more particularly a liquid such as oil or water, to provide some of the reaction; and then, instead of expending this stored energy uselessly, this potential energy is returned to the system to provide the remaining reaction. Thus the reaction is provided by putting energy into the liquid and then returning the energy to the system. The wasted energy, or energy converted into heat, is only that represented by hydraulic losses and frictional losses in the flow of the liquid.

The device comprises elements cooperating to form a torus chamber, including an annular stator and a rotor within the stator bore and having a running clearance with respect thereto. The rotor and the stator have vanes or partitions therein which define passageways through which the liquid flows and through the means of which the reaction is provided as the rotor rotates within the stator. The rotor has an outlet from which the oil flows into the inlet of the stator, and the stator has an outlet from which the liquid flows back into the inlet of the rotor. It is an object of the invention to provide an arrangement wherein the liquid enters the rotor inlet without shock, and this, even though the stator has reversed the velocity angle of the liquid passing therethrough so that the velocity of the liquid entering the rotor inlet is in a direction opposing the direction of rotation of the rotor. A further object of the invention is to provide an arrangement where the liquid enters the stator inlet substantially without shock even though the angle of the stator vanes at the inlet is the determining factor of liquid flow in the torus chamber and the lineal and radial velocities are functions of this angle.

A further object of the invention is to provide a hydraulic torque reaction device involving a torus chamber wherein the flow of liquid in the torus chamber is initiated and maintained by velocity head as distinguished from pressure head, although in one form of the invention the device may be arranged so that a pressure head is set up due to centrifugal force. Where the pressure head is set up in addition to the velocity head, the actual radial velocity may be made to substantially correspond to the theoretical radial velocity as established by the angle of the vanes at the stator entrance so that the liquid enters the stator without shock.

The invention will be better understood as the following description is considered in connection with the accompanying drawings wherein are shown devices for carrying out the invention.

Figure 1:
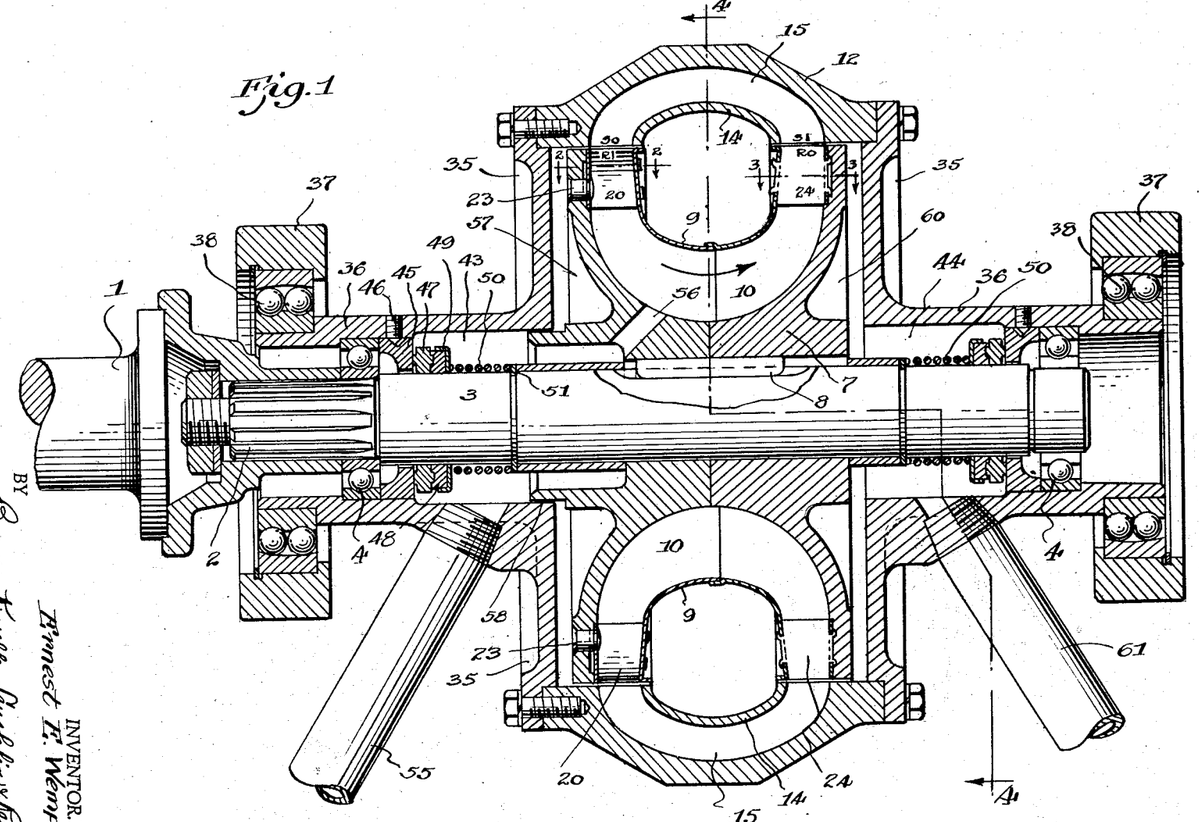
Fig. 1 is a cross sectional view of a structure involving a torus chamber constructed in accordance with the invention and showing an arrangement useful as an absorption dynamometer.
Figure 2:
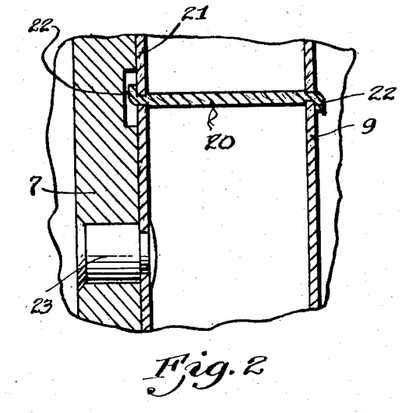
Fig. 2 is a detailed sectional view taken substantially on line 2—2 of Fig. 1 showing vane structure of the rotor.
Figure 3:
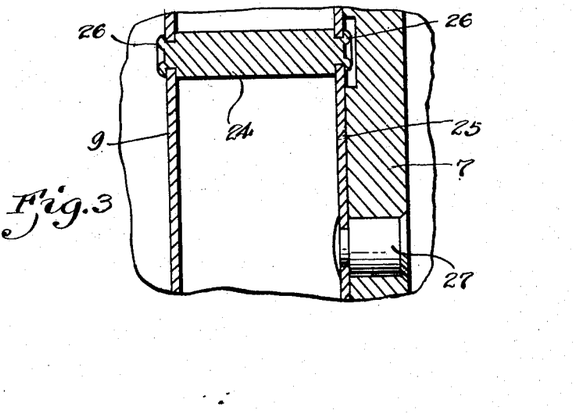
Fig. 3 is a cross sectional view taken substantially on line 3—3 of Fig. 1 showing vane structure of the rotor.

In Fig. 1 the driving shaft of an engine or other source of power is illustrated at 1 having a driving connection at 2 with a driving shaft 3 journaled in bearings 4. The rotor of a torus chamber has a member 7 keyed or otherwise fixed to the shaft 3 as at 8 to be driven thereby. The rotor forms the inner portion of the torus chamber and it has a core member 9 which cooperates to define a channel 10. The stator is illustrated at 12 and it is formed with a core member 14 to form passageways 15 defined by partitions 16 and vanes 17 and 18. The direction of flow of the oil in the torus chamber is counterclockwise as Fig. 1 is viewed, so that the stator inlet is at SI and the stator outlet at SO, while the rotor inlet is at RI and the rotor outlet at RO.

The rotor is provided with vanes at its inlet and at its outlet. At the inlet the vanes 20 are disposed between the core 9 and a plate 21, and each vane may be held in position by having tabs or fingers 22 extending therethrough and being bent over, while the plate 21, which is in the form of a ring or washer, has a driving connection with the member 7 as by means of studs 23. At the outlet, the vanes 24 are disposed between the core 9 and a ring or plate 25, and each vane has extending metal parts as at 26 extending through suitable apertures in the core 9 and plate 25 and bent or riveted over as illustrated. The plate 25 has a driving connection with the member 7 as by means of studs 27.

Figure 4:
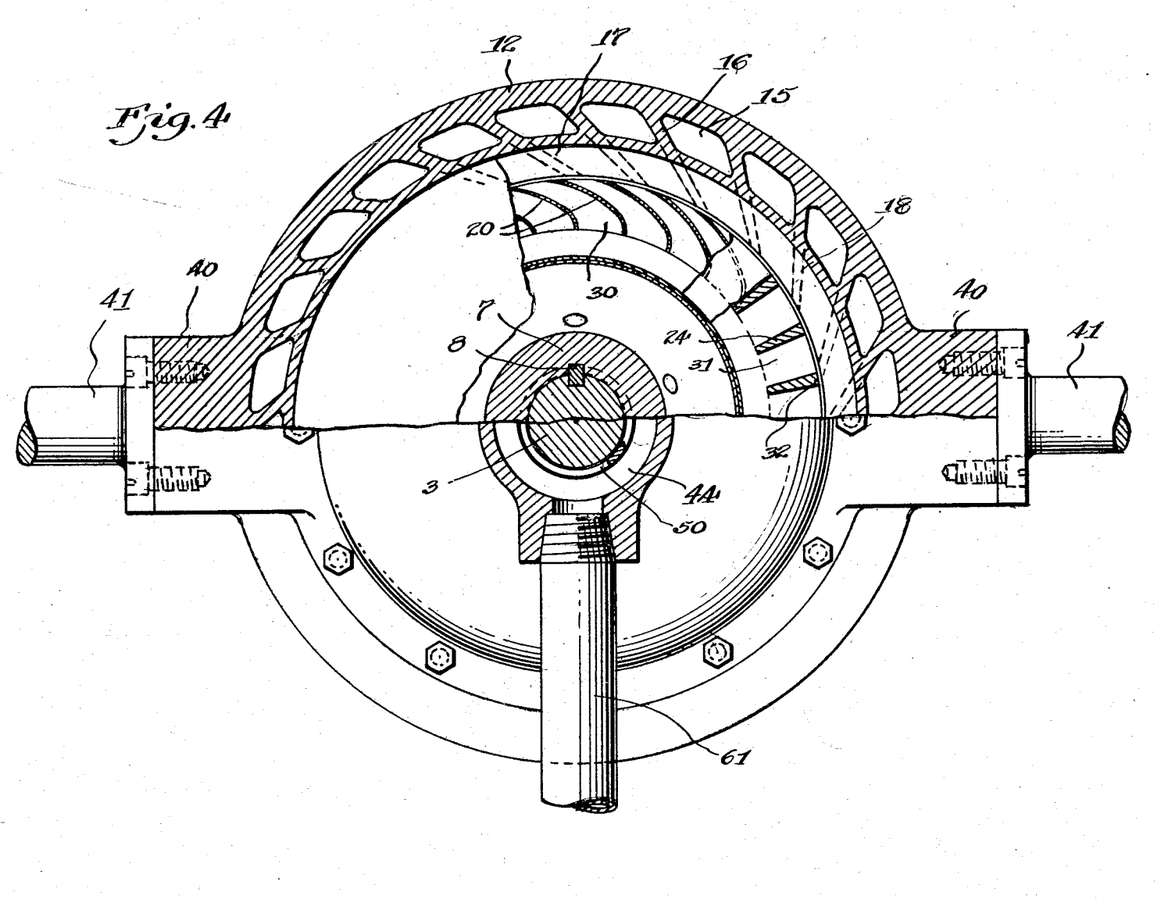
Fig. 4 is a view partly in section taken substantially on line 4—4 of Fig. 1 showing principally the stator and rotor vanes.

As will be seen by reference to Figs. 4 and 7, the vanes 20 are of curved formation, which curve and the function thereof will be discussed in more detail later, and adjacent vanes provide passageways 30. The vanes 24 at the rotor outlet, as shown in Fig. 4, are radial but are not of uniform thickness. The adjacent vanes provide passageways 31. Due to the curvature of the vanes 20 (Fig. 7) their outer edges present an effective thickness greater than the thickness of the vane stock, as indicated by the distance X in Fig. 7, and the radial vanes 24 are shaped so that the dimension across their outer edges 32 is equal to the dimension X. Thus the passageways 30 and 31 present substantially equal flow areas.

The stator also comprises end plates 35 secured to the stator casting 12, and these have sleeve-like extensions 36 journaled in blocks 37 advantageously through the means of antifriction bearings 38. Thus the stator as a whole is mounted so that it can rock or oscillate, and as shown in Fig. 4, the stator has extension pads 40 adapted to receive arms 41, one or both of which are arranged to be secured to or mounted upon a suitable scale or other torque measuring means.

This construction provides a chamber 43 and a chamber 44, and a seal is provided for each chamber residing in suitable sealing members including a sealing ring 45 secured to the sleeve 36 as by means of a set screw 46, and a co-operating sealing member such as a carbon ring 47 held in frictional engagement with the ring 45. A block or ring of rubber, or synthetic material similar to rubber, as shown at 48, is retained in a metal ring 49 and it is backed up by a coil spring 50 positioned by a snap ring 51 on the drive shaft 3. The seal structures for the two chambers are the same, and the same reference characters are applied to both seals.

The liquid is introduced into the unit through a suitable conduit 55, and a plurality of passageways are formed in the member 7 as shown at 56, and which connect the chamber 43 with the inner portion of the torus chamber. The torus chamber, of course, is not sealed as there is an escape of liquid at the running fit between the rotor and the stator. The liquid which escapes at the stator outlet and rotor inlet may flow through a passage 57 and leak through a running fit between the rotor and stator at 58 and back into the inlet chamber 43. The liquid which escapes at the rotor outlet and stator inlet may flow into and through a chamber 60 and into the chamber 44 from where the fluid may flow out through an outlet conduit 61. It will be understood that liquid is supplied under suitable pressure through the inlet 55 during the operation of the device.

Figure 10:
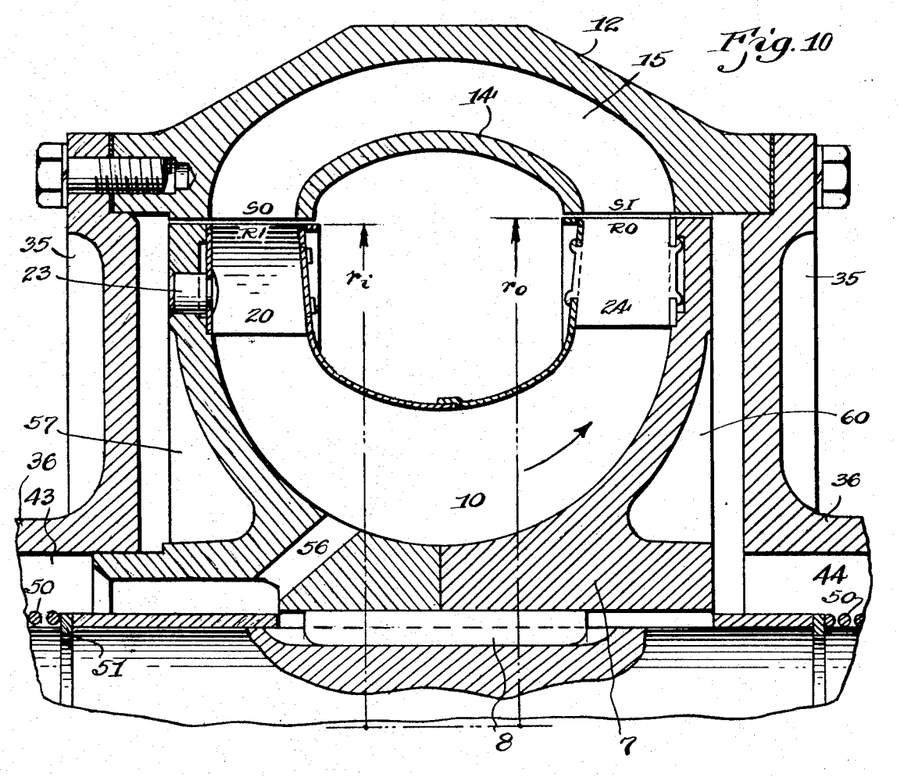
Fig. 10 is a view of a modified form wherein a pressure head is set up in the torus chamber.

In Fig. 10 a form is shown which, in structure, is basically the same as the structure of the device shown in Fig. 1, with the difference that the rotor outlet is on a greater radius than the rotor inlet. The stator inlet and stator outlet are correspondingly arranged for the desired running fit. Like reference characters are applied to like parts. The broken radial lines $ri$ and $ro$ of Fig. 10 indicate the difference in the radii. The purpose of this construction will be later set forth, but it may be briefly said at this time that this arrangement sets up a pressure head due to centrifugal force which is unbalanced, and thus sets up a velocity head for the flow of liquid in the rotor in the direction of the arrow indicated in Fig. 10, or, in other words, counter-clockwise as Fig. 10 is viewed.

The operation of the hydraulic unit can probably be best considered in conjunction with the particular formation and function of the curved vanes 20. In considering the operation of the form shown in Fig. 1, it will be noted that the inlet and the outlet of the rotor are on the same radius. Considering the device in operation with the rotor operating at any given speed and with the torus chamber full of liquid, the lineal velocity of the liquid on both sides of the torus chamber is equal and the pressure head on both sides is equal. This pressure is communicated to the liquid in the stator making the pressure head throughout the stator passageways equal to the pressure at the radius of the rotor inlet and outlet. The pressure head in the torus chamber is thus balanced and there is a zero velocity flow due to pressure head. This is the condition which exists or would exist if there were no vanes in the device, and particularly if there were no vanes in the rotor. The pressure head is at its minimum at the inner radius of the torus chamber and at its maximum at the radius of the inlet and outlet of the torus chamber. There is, however, a radial flow of liquid in the torus chamber which, as Fig. 1 is viewed, is counter-clockwise, or in other words, in the direction of the arrow, for reasons which will presently appear; any tendency toward acceleration of velocity due to the difference in pressure head on the outlet side of the rotor will be exactly balanced by the tendency toward deceleration of velocity due to difference in pressure head on the other side of the rotor. Thus the flow of liquid in the torus chamber is independent of the pressure head. The flow of liquid in the torus chamber is incident to and depends upon velocity head.

It is a well-known fact that a change in angular momentum of a mass is accompanied by work done. If the angular momentum of a pound of liquid on a vane is increased, work is performed on the liquid by the vane and energy is stored in the liquid. On the contrary, if the angular momentum of a pound of liquid is decreased, work is performed on the vane and energy is released by the liquid.

This is the principle employed in the operation of the device. The operating cycle is as follows, considering one cycle as a complete circuitous flow of a particle of liquid through the torus chamber:

(1) The liquid is accelerated in the rotor from zero angular momentum to a maximum angular momentum as represented by the angular momentum at $r_0$, thereby storing energy in the liquid.

(2) The liquid passes from the rotor into the stator and thence around the 180° bend to the stator exit, thereby reversing its direction of velocity.

(3) The liquid leaves the stator exit at the same velocity angle but in the opposite direction to that at the stator entrance, and the liquid is directed onto the advancing curved vanes at the inlet side of the rotor.

(4) By a proper design of the curved vanes in the rotor the liquid may be received in the inlet of the rotor without shock. After the liquid has entered the rotor inlet the angular momentum of the liquid is, due to the curved vanes, decelerated to zero, this point being reached at some mid-section of the vanes.

(5) This is really the division point between the cycles. As the liquid passes over the inner portion of the curved vanes, its angular momentum is again accelerated to that represented by the lineal velocity of the exit radius of the curved vanes. The liquid leaves the curved vanes with this lineal velocity and angular momentum, passes around the 180° bend in the torus chamber, and is received at the entrance of the radial vanes in the outlet side of the rotor without shock. When the liquid is received by the radial vanes it already has the same lineal velocity as the lineal velocity of the radial vanes at their inner radius since the inner radii of the curved vanes and the inner radii of the radial vanes are the same. In passing along the radial or outlet vanes the angular momentum is further increased to a maximum at the radius of the outlet of the rotor. This is the situation which existed at the end of item 1 of the description of the operating cycle.

To recapitulate in brief: In increasing the angular momentum of the liquid from zero to maximum, work is done on the liquid by the vanes, the liquid is given an absolute velocity, and energy is stored in the liquid. In the stator this absolute velocity is reversed and the liquid is directed as a jet onto the advancing curved vanes of the rotor. Work is done on the curved vanes by the liquid and its stored energy is given up to the vanes in decreasing its angular momentum from maximum to zero. This is at a point in the mid-section of the curved vanes. The curved vanes, however, have a double function in that: they receive the liquid at maximum lineal velocity and angular momentum, decelerate it to zero lineal velocity and angular momentum at a mid-point on the vanes, and then re-accelerate the liquid to a lineal velocity and angular momentum to where it may be received by the radial vane at the outlet side of the rotor without shock. The radial vanes receive the liquid with this definite lineal velocity and corresponding angular momentum and function to accelerate the liquid to its maximum lineal velocity and angular momentum.

As stated before, a change in angular momentum of a mass requires work; work is energy and energy per unit time is power. Therefore, change of mass angular velocity equals the torque necessary to produce the change. Accordingly, accelerating the liquid from zero angular momentum to maximum angular momentum requires a torque on the rotor and its drive shaft. This acceleration is performed by the inner portions of the curved vanes and by the radial vanes. Likewise, the decelerating of the liquid from maximum angular momentum to zero angular momentum requires an additional torque on the rotor and its drive shaft if the same speed is to be maintained. This deceleration is performed by the outer portions of the curved vanes and the torque of acceleration and torque of deceleration are applied to the rotor and its drive shaft in the same direction because the stator has reversed the absolute velocity of the liquid. Therefore, the sum of the two torque requirements is the torque necessary to drive the rotor and its shaft.

The liquid, as it enters the stator, has a certain absolute velocity and creates a turning moment or torque on the stator equal to and opposing the torque reaction on the shaft due to the acceleration of the liquid from zero to maximum angular momentum. Likewise the liquid leaving the stator has a certain absolute velocity and creates a certain torque reaction on the stator equal to and opposing the torque on its rotor and shaft due to the deceleration of the liquid from maximum to zero angular momentum. The sum of the two equals the total torque reaction on the stator.

One of the peculiar advantages of this type of circuit lies in the fact that, in one cycle, the angular momentum is changed from zero to maximum and back to zero again. Because of this fact a maximum amount of torque is required to drive the machine.

As we have shown:

$$\text{Torque} = \text{Mass} \times \text{change in angular momentum}$$

and as the angular momentum change varies with the square of lineal velocity, the torque of acceleration $$= \text{Mass (Max. line. vel.}^2 - 0 \text{ lin. vel.}^2)$$
$$= \text{Mass} \times \text{Max. lin. vel.}^2$$

and the torque required to resist the deceleration of the fluid from maximum to zero angular momentum in the opposing direction is—

$$\text{Torque of deceleration} = \text{Mass (0 lin. vel.}^2 - \text{Max. lin. vel.}^2)$$
$$= \text{Mass}(-\text{Max. lin. vel.}^2)$$

and the total torque required to drive the machine is—

$$\text{Total torque required} = \text{Mass}\,[(\text{Max. lin. vel.}^2) - (-\text{Max. lin. vel.}^2)]$$
$$= \text{Mass}\,(2 \times \text{Max. lin. vel.}^2)$$

Mass in this case is the quantity of fluid circulated, in lbs./sec. divided by gravity $= q./g.$ So total torque required =

$$\frac{q}{g}(2 \times \text{Max. lin. vel.}^2)$$

This analysis is based on the assumption of a radial vane at exit from the rotor to the stator, and of a radial tip of the rotor to the stator, and of a radial tip of the rotor inlet vane. In this case, the tangential component of the absolute velocity is the same as the lineal velocity. To make the torque equation general, tangential component of the absolute velocity must be substituted for lineal velocity, and the equation will hold so long as the vanes are designed in accordance with good hydraulic practice for shockless entrance, and for reducing the angular momentum to zero at some point in the circuit.

In this circuit the angle of the stator vanes at the stator inlet determines the radial velocity of torus flow. This in turn determines the quantity of liquid circulated per unit of time or mass per unit of time, and the torque required to drive the device is directly proportional to the quantity of liquid circulated. Therefore, the capacity of the device can be governed by the selection of the angle of the stator vanes.

Since the radial velocity of the torus flow is determined by the angle of the stator vanes the lineal and radial velocity are functions at this angle, and it can be shown that the radial velocity equals lineal velocity times the tangent of the stator vane angle. Expressed algebraically, this is $$f = v \tan \alpha$$

where $v$ is the lineal velocity at $r_0$ and $\alpha$ = the angle between the absolute and lineal velocity, or in other words is the stator vane angle. A little consideration will show that the radial velocity $f$ varies directly with the lineal velocity $v$ and therefore the angle $\alpha$ is correct for all speeds. The relationship between the lineal and radial velocities at the rotor outlet is shown by the vectorial velocity diagram of Fig. 9. Assume a stator inlet vane angle $\alpha$ and an absolute velocity $u$ and any lineal velocity $v$: With a full torus chamber, and after the liquid has been circulated at least through one cycle, the radial velocity will be $f$. Let $v'$ be any other lineal velocity greater than $v$; then under the same conditions this will induce a radial velocity $f'$.

$$\frac{f}{v} = \text{tangent } \alpha$$

$$\frac{f'}{v'} = \text{tangent } \alpha$$

or $$\frac{f}{v} = \frac{f'}{v'}$$

Changes in the radial velocity are proportional to the changes in lineal velocity. Therefore, the radial and lineal velocities are functions of the stator vane angle.

By the same general type of analysis it may be shown that if the entrance to the curved vanes in the rotor be made parallel to the vector representing the relative velocity of the jet to the vane at any lineal velocity of the vane, this entrance angle will be the same for any other lineal velocity of the vane.

In the description of the operating cycle (item 4), it is stated that by proper design of the curved vanes of the rotor, the liquid may be received by the rotor without shock. This is done by combining the absolute velocity of the liquid jet at the stator outlet with the lineal velocity of the vane, to determine the relative velocity of the jet with respect to the vane and the angle between the relative velocity and the lineal velocity. If the tip of the curved vane be made parallel to the relative velocity at the point of entrance, or in other words if a tangent at the tip of the vane is parallel to the relative velocity vector, the vane will fulfill the requirement of shockless entrance of liquid into the rotor.

Figures 7, 8, 9:
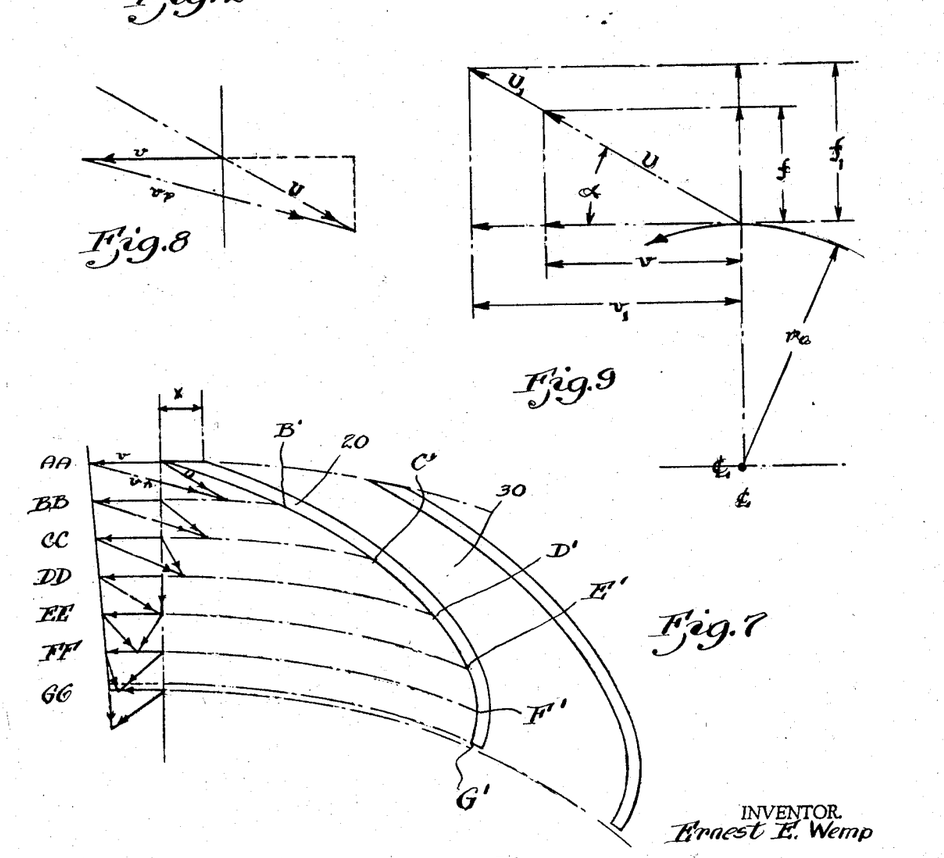
Fig. 7 is a diagrammatic view illustrating a stator inlet vane and showing a series of vectorial velocity diagrams in illustration of the function of the vane.
Fig. 8 is an enlarged view of one of the vectorial diagrams.
Fig. 9 is a vectorial diagram illustrating that the lineal and radial velocities are functions of the angle of the vanes at the stator inlet.

Considering in this connection the diagrammatic view of Fig. 8: The vector $u$ represents the absolute velocity of the liquid jet at the stator exit and therefore at the rotor inlet; the vector $v$ is the lineal velocity of the vane; $v_r$ represents the velocity of the jet relative to the vane.

Accordingly, the tip of the curved vane is made parallel to $v_r$ at the point of entrance for shockless entry. The double function of the curved vane will be more clearly appreciated by a consideration of the diagram in Fig. 7. In this view a number of diagrams are indicated at corresponding positions extending from the outer to the inner radius of the vane. The outermost diagram AA corresponds to Fig. 8 where the tip of the vane coincides with the point of origin of $u$ and $v$ and is parallel to $v_r$. The next inward diagram BB corresponds to the point B' on the vane and it will be noted, that due to the curvature of the vane, the absolute velocity $u$ has been turned through an angle so that the absolute velocity is directed more toward the center of rotation and thus the angular momentum of the liquid has been decelerated to this extent. The next inward diagram CC corresponds to the point C' on the vane where it will be noted that the angular momentum has been further decelerated; the next inward diagram DD corresponds to point D' on the vane and it will be noted here that the angular momentum of the liquid has been reduced to zero since the absolute velocity is radial. This is the point of division between the start and end of the cycle of flow of liquid in the torus chamber. The jet has entered the vane without shock and has been gradually decelerated to zero angular momentum and the energy in the liquid has been given up to the vane with resultant torque on the rotor and its shaft. The curve of the vane continues to now accelerate the angular momentum as progressively indicated by the diagrams EE, FF, and GG corresponding respectively to points E', F' and G' on the vane. This is the second function of the curved vane; and in thus accelerating the angular momentum of the liquid, energy is again stored in the liquid and as a result requires torque on the rotor and drive shaft.

Thus it will be seen that with the pressure head balanced out, the flow of liquid in the torus chamber is due to velocity head. The innermost portions of the vanes from the point DD inwardly impart angular momentum to the liquid and the liquid flows through the 180° bend in the rotor and is delivered to the radial vanes at the rotor outlet where the angular momentum is increased. The stator reverses the velocity angle and the liquid is then decelerated from maximum angular momentum to zero angular momentum from the vane tip to the point D'. The lineal velocity of the liquid, as it leaves the curved vanes, preferably corresponds to the lineal velocity at the inlet of the radial vanes so that the liquid, after passing through the 180° bend in the rotor, enters the radial vanes without shock.

Figures 5, 6:
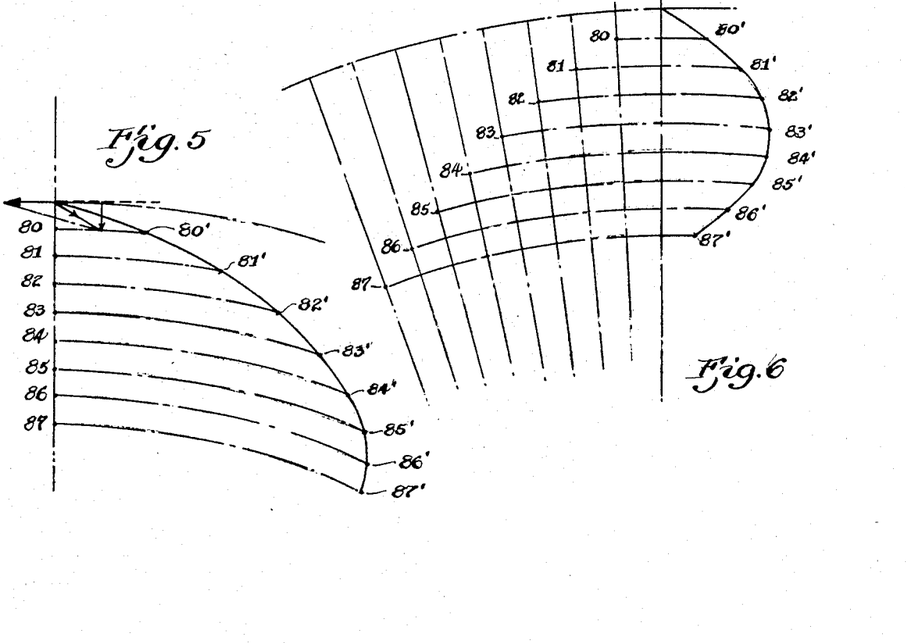
Fig. 5 is a diagrammatic view showing increments of travel of a liquid particle along a curved vane of the rotor.
Fig. 6 is a view comparable to Fig. 5 showing the absolute velocity path of a particle of liquid along the moving curved vane.

The absolute velocity path of a particle of liquid along a curved vane of the rotor is indicated in Fig. 6, but reference should also be made to Fig. 5. In Fig. 5 the contour or surface of a curved vane is illustrated and also a radial line is illustrated drawn inwardly from the tip of the vane. This radial line is divided into equal increments of an arbitrary size 80 to 87, inclusive, and the corresponding increments are shown on the vane at 80' to 87', inclusive, these increments ceive the liquid at their tips 121 at maximum angular momentum and decelerate the liquid to zero angular momentum at their outlet tips 122. The vanes 24c receive the liquid at zero angular momentum at their inlet tips 123 and accelerate the liquid so that it has maximum angular momentum at their outlet tips 124. In this latter form the liquid passes through the inner or bight portion of the chamber in the rotor by flow in a substantially true radial direction relative to the rotor. In all these forms the vanes are preferably arranged to receive the liquid without shock in the manner above described.

Figure 11:
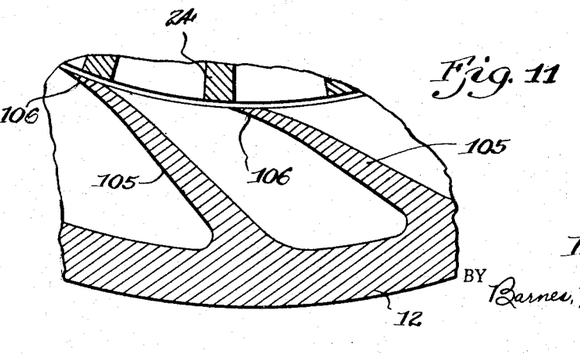
Fig. 11 is a detail section showing a modified form of entrance vane structure for the stator.

In Fig. 11 a modified form of stator inlet vane is shown. This inlet vane at its major portion 105 has an angle such as to determine the radial velocity through the torus chamber. Due to frictional losses, however, the radial velocity will be somewhat less than the theoretical velocity as set by the major portion 105 of the vane. To insure shockless entry of the liquid into the stator at the tips of the vanes, the tips are given a slightly less abrupt angle, by forming the tips on a radius, thus giving them a slightly curved form as at 106. The angle at the extreme tip may, therefore, substantially cause entrance of the liquid without shock and then the angle from the extreme tip gradually changes to the controlling angle of the major portion 105.

In considering the action of the liquid as it is received at the entrance of the curved vanes with a near maximum angular momentum, it has been stated that the liquid gives up its energy to the vanes in being decelerated from maximum to zero angular momentum and thus requires additional torque on the rotor and its shaft. This action may be compared to an automobile being driven into a head-on wind. The momentum of the air gives up energy to the swept area of the car and requires additional expenditure of energy in the way of fuel to maintain car speed. Work is always performed in the direction of motion. The wind in the above case, increases the work required by adding to the resistance to motion.

In this circuit, work must also be performed in the direction of motion, and the deceleration of the liquid from maximum to zero angular momentum adds to the resistance to rotation and therefore requires more work (or torque) to maintain the motion of the rotor. This action must be distinguished from that of a turbine where energy of either water or steam performs work on the drive shaft. Here the feed back energy of the liquid, as it is returned to the rotor, increases the resistance to rotation, and increases the work performed by the drive shaft.

I claim:

1. A torque reaction device comprising a stator and a rotor cooperating to form a torus chamber adapted to be filled with liquid, the stator and rotor each having an inlet and an outlet, vanes adjacent the rotor outlet for accelerating the liquid to maximum angular momentum, vanes, in the stator for receiving the liquid from the rotor outlet and arranged to change the direction of absolute velocity of the liquid and to direct the liquid from its outlet into the rotor inlet in a direction which opposes the direction of absolute velocity at the rotor outlet, and curved vanes adjacent the rotor inlet positioned so that a tangent at the entrance tips thereof is substantially parallel to the direction of relative velocity of the liquid entering the rotor inlet, the curvature of the vanes being such as to decelerate the angular momentum of the liquid from maximum to zero and to then re-accelerate the liquid to a lineal velocity and angular momentum such that the liquid enters the vanes adjacent the rotor outlet without shock.

2. A torque reaction device comprising a stator and a rotor cooperating to form a torus chamber adapted to be filled with liquid, the stator and the rotor having cooperating inlets and outlets, vanes in the rotor for accelerating the liquid to maximum angular momentum, vanes in the stator for changing the direction of absolute velocity of the liquid and directing the same back into the rotor in a direction opposing that at the rotor outlet, and other vanes in the rotor for receiving the liquid from the stator and having a curvature such as to gradually decelerate the angular momentum from maximum to zero.

3. A torque-reaction device comprising a stator and a rotor cooperating to form a torus chamber adapted to be filled with liquid, the stator and the rotor having cooperating inlets and outlets, vanes in the rotor for accelerating the liquid to maximum angular momentum, vanes in the stator for changing the direction of absolute velocity of the liquid to an opposing direction and directing the same back into the rotor, and other vanes in the rotor for receiving the liquid from the stator having their entrance tips substantially parallel to the direction of relative velocity of the liquid entering the rotor and being curved to decelerate the angular momentum of the liquid from maximum to zero and to re-accelerate the liquid to a lineal velocity and angular momentum corresponding to that required for the entry of the liquid into the first named vanes of the rotor without shock.

4. A torque reaction device comprising an annular stator having an inwardly opening inlet and outlet provided with vanes, a rotor within the stator having an outwardly opening inlet and outlet facing the stator outlet and inlet respectively, the stator and rotor cooperating to form a torus chamber adapted to be filled with liquid, vanes at the rotor outlet, curved vanes at the rotor inlet, the inner radii of the vanes at the outlet and inlet being substantially equal and the torus chamber having an unvaned channel connecting the vaned portions at the inlet and outlet, the inner portions of the curved vanes having a curvature such as to accelerate the angular momentum of the liquid from zero to a lineal velocity and angular momentum such that the liquid may enter the radial vanes at the outlet without shock, said vanes at the outlet accelerating the angular momentum of the liquid to a maximum, the stator vanes being arranged to change the direction of absolute velocity of the liquid to an opposing direction and to pass the same back into the inlet of the rotor in the direction opposing movement of the curved vanes, said curved vanes having curved portions such as to decelerate the angular momentum of the liquid from maximum to zero.

5. In a torque reaction device having a torus chamber for liquid and in which flow of liquid through the torus chamber depends, at least partially, upon velocity head, an annular stator having vanes and an inwardly opening inlet and outlet, a rotor within the stator having an outwardly opening inlet and outlet cooperating respectively with the stator outlet and inlet, vanes at the rotor outlet for accelerating the liquid to maximum angular momentum, the vanes in the stator being, in effect, increments of time. As a particle of liquid moves from the tip of the vane to the point 80' on the vane it has moved radially inward corresponding to the point 80, and when the particle has moved to the point 81' on the vane it has moved radially inward to the point 81, and so on. However, considering Fig. 6, the vane is not stationary, but is moving to the left as these figures are viewed. Accordingly, as the particle moves along the vane to the position 80' thereon, the point 80' has moved to the position illustrated in Fig. 6, while the radial position 80 under the tip of the vane has moved to the corresponding position 80 in Fig. 6. The several radial positions 80 to 87 in Fig. 6 are drawn respectively on a radial line from the tip and accordingly the several positions 80' to 87' inclusive, show the corresponding actual positions on the vane surface. Accordingly, a line connecting the points 80' to 87' inclusive, illustrate the absolute velocity path of a particle of liquid along the curved vane. It will be noted how the absolute velocity angle is gradually changed so that the angular momentum at from about the point 83' to the point 84' is at zero, the direction being radial; and that inward from this location angular momentum is again imparted to the liquid. This is without shock as will be seen by the gradual curved formation of the absolute velocity path.

The circuit is a closed one of substantially uniform section. Therefore, the Bernoulli theorem for continuity of flow holds. If there were no friction losses the actual velocity of torus flow would be equal to the theoretical velocity as established by the vane angle at the stator entrance. Friction, however, will have the effect of lowering the radial velocity or velocity of flow, and therefore the stator vane angle will not quite conform to that which will insure shockless entry into the stator. The angle of the curved vanes in the rotor may be varied to compensate for this actual lowering of the velocity under the theoretical, but this cannot be done with the stator vanes at its entrance because the stator vanes are the ones which establish the theoretical radial velocity.

The modified form as shown in Fig. 10 may be employed to overcome this difficulty of some shock at the entry into the stator. With the difference in radii between the inlet and the outlet of the rotor, the pressure head, due to centrifugal force, is no longer balanced out. The unbalanced pressure head is converted into a velocity head whose direction of flow is the same as the velocity head induced by the rotor vanes, because the rotor outlet is on a slightly greater radius than the inlet. This additional velocity head may be so arranged and calculated as to substantially offset the normal drop in radial velocity due to friction and hydraulic losses, so that the actual radial velocity is substantially equal to the theoretical radial velocity as established by the angle of the vanes at the stator entrance. With the actual radial velocity thus corresponding to the theoretical, the device can function with shockless entry of the liquid both from the rotor to the stator and from the stator back to the rotor. The radial velocity of flow due to the unbalanced pressure head will require additional torque on the drive shaft, but this should be compensated for by a higher operating efficiency.

Thus it will be seen that torque is required to drive the rotor in accelerating the liquid from zero angular momentum to maximum angular momentum and to decelerate the liquid from maximum angular momentum to zero angular momentum and that the stator is a stationary member to provide the necessary torque reaction. There is a feed back of energy from the stator to the rotor so that all of the energy of the input torque is usefully employed except that which is represented by frictional and hydraulic losses. The reaction on the stator as above pointed out can be measured by any suitable means where the device is user as an absorption dynamometer.

In the rotor described above, the vanes at the rotor inlet perform the dual function of decelerating the liquid from maximum angular momentum to zero angular momentum, and then accelerating the liquid to some extent but not to its maximum, while the vanes at the outlet complete the acceleration of the liquid to maximum angular momentum. The vanes, however, may be otherwise arranged for decelerating the liquid from maximum angular momentum to zero and then accelerating the liquid from zero to maximum angular momentum; and other vane forms are shown in Figs. 12 to 19, inclusive.

Figure 12:
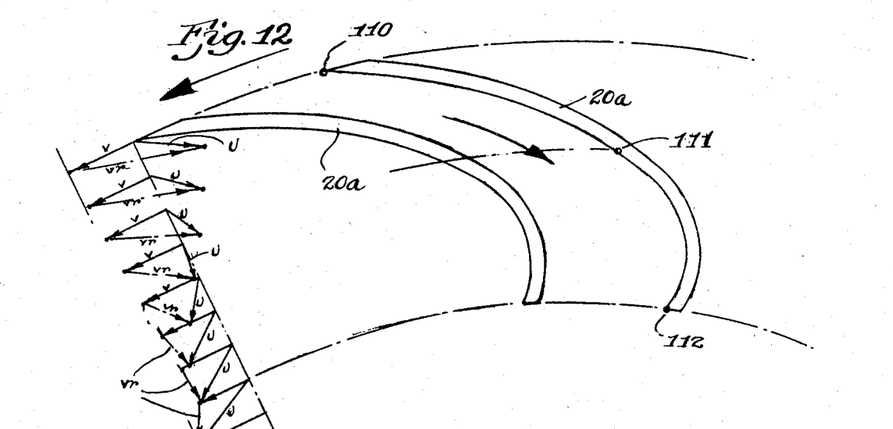
Fig. 12 is a view illustrating a modified vane structure.
Figures 13, 15:
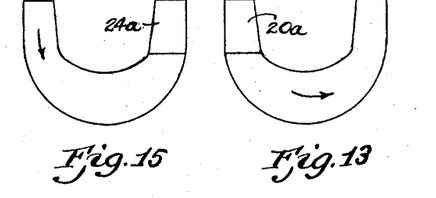
Fig. 13 is a schematic view of the rotor employing the vane structure shown in Fig. 12.
Fig. 15 is a schematic view of a rotor utilizing the vane structure shown in Fig. 14.

In the form shown in Figs. 12 and 13, the vanes at the rotor inlet perform both functions of decelerating the liquid from maximum angular momentum through zero and then accelerating the liquid to maximum angular momentum. The vectorial diagrams illustrate how the absolute velocity $u$ is received, progressively changed until it is radial, and then increased until the absolute velocity $u$ substantially equals the absolute velocity as received but in the reverse direction. This vane, indicated at 20a, decelerates the liquid from its tip 110 to about the point 111 where the angular momentum is about zero, and accelerates the liquid from zero to maximum angular momentum from about the point 111 to its outlet tip 112. The arrows indicate the direction of rotation of the rotor and the direction of flow through the vanes. A rotor with this structure need have no vanes at its outlet as shown in Fig. 13.

Figure 14:
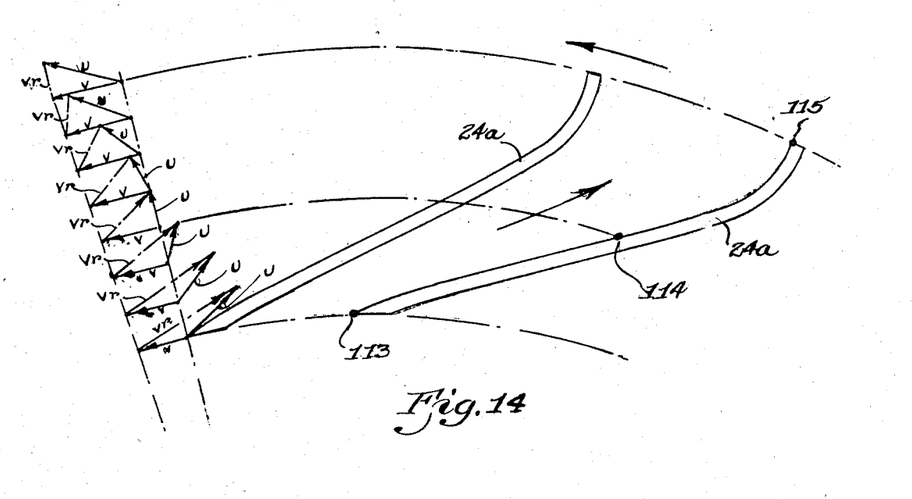
Fig. 14 is a view illustrating another form of vane structure.

In the form shown in Figs. 14 and 15 the rotor need have no vanes at its inlet, while the vanes 24a, at the outlet, perform the functions of decelerating the liquid from maximum to zero angular momentum and accelerating the liquid from zero to maximum angular momentum. This vane 24a receives the liquid at its inner tip 113 and its form is such that at about the point 114 the liquid has been decelerated to zero angular momentum, as shown by the several vectorial diagrams, while from the point 114 to the outlet tip 115 the liquid is again accelerated to maximum angular momentum.

Figures 16, 18:
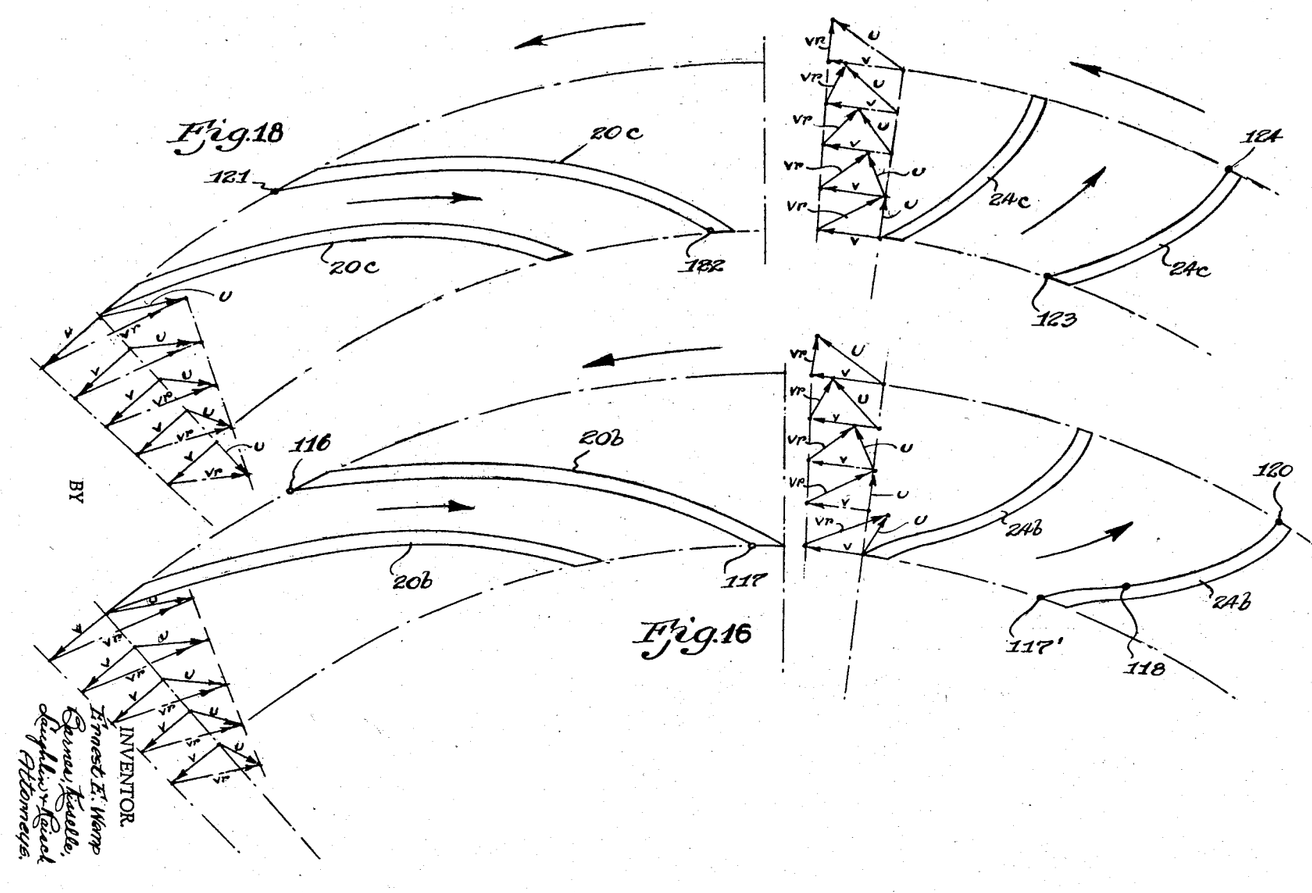
Fig. 16 is a composite view illustrating a further form of vane structure for the rotor.
Fig. 18 is a view illustrating a still further form of vane structure.
Figure 17:
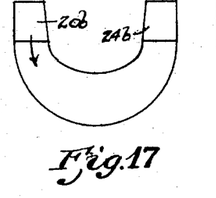
Fig. 17 is a schematic view illustrating a rotor utilizing the vane form shown in Fig. 16.

In Figs. 16 and 17 the rotor is provided with vanes 20b and vanes 24b, and in this case the vanes 20b at the inlet decelerate the liquid towards zero angular momentum but not entirely to zero as indicated by the vectorial diagrams. The vanes 24b receive the liquid and, as illustrated by the accompanying vectorial diagram, continue this deceleration to zero, and then accelerate the liquid to its maximum angular momentum. As illustrated, the vanes 20b receive the liquid at their tips 116 and have effected a partial deceleration at their outlet tips 117, while the vanes 24b receive the liquid at 117' and continue the deceleration to zero at about the point 118. From the point 118 to the outlet tips 120, the liquid is accelerated to maximum angular momentum.

Figure 19:
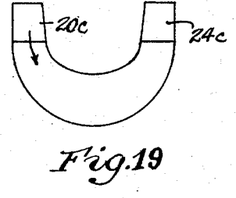
Fig. 19 is a schematic view of the rotor using the vane structure illustrated in Fig. 18.

In Figs. 18 and 19 there is an equal division of function, in that the vanes 20c at the inlet rebeing arranged to change the direction of absolute velocity of the liquid to an opposing direction, and curved vanes at the rotor inlet having curved portions for decelerating the angular momentum of the liquid from maximum to zero and curved portions for accelerating the liquid to a lineal velocity and angular momentum.

6. In a torque reaction device having a torus chamber for liquid and in which flow of liquid through the torus chamber depends, at least partially, upon velocity head, an annular stator having vanes and an inwardly opening inlet and outlet, a rotor within the stator having an outwardly opening inlet and outlet cooperating respectively with the stator outlet and inlet, vanes at the rotor outlet for accelerating the liquid to maximum angular momentum, the vanes in the stator being arranged to change the direction of absolute velocity of the liquid to an opposing direction, curved vanes at the rotor inlet having outer portions for decelerating the angular momentum of the liquid from maximum to zero, the radius at the inner edges of the curved vanes being substantially the same as the radius of the inner edges of the vanes at the rotor outlet, and the curved vanes having inner curved portions for re-accelerating the liquid to a lineal velocity and angular momentum such that the liquid enters the vanes at the rotor outlet without shock.

7. A torque reaction device comprising a stator and a rotor cooperating to form a torus chamber adapted to be filled with liquid, the stator and the rotor having cooperating inlets and outlets, the stator being arranged to receive liquid from the rotor outlet and to discharge the liquid into the rotor inlet and having vanes for reversing the absolute velocity of the liquid, curved vanes at the rotor inlet for decelerating liquid from maximum angular momentum to zero angular momentum, and vanes at the rotor outlet for accelerating the liquid from zero angular momentum to maximum angular momentum.

8. A torque reaction device comprising a stator and a rotor cooperating to form a torus chamber adapted to be filled with liquid, the stator and the rotor having cooperating inlets and outlets, the stator being arranged to receive liquid from the rotor outlet and to discharge the liquid into the rotor inlet and having vanes for reversing the absolute velocity of the liquid, vanes at the rotor inlet for decelerating the liquid from maximum angular momentum to a lesser angular momentum, and vanes at the rotor outlet for decelerating the liquid from the lesser angular momentum to zero angular momentum and for reaccelerating the liquid to maximum angular momentum.

9. A torque reaction device comprising a stator and a rotor cooperating to form a torus chamber adapted to be filled with liquid, the stator and the rotor having cooperating inlets and outlets, the stator being arranged to receive liquid from the rotor outlet and to discharge the liquid into the rotor inlet and having vanes for reversing the absolute velocity of the liquid, the rotor having a vaned portion positioned adjacent the inlet for decelerating the liquid from maximum angular momentum to zero angular momentum and for accelerating the liquid from zero angular momentum to maximum angular momentum and having an unvaned portion adjacent the outlet.

10. A torque reaction device comprising a stator and a rotor cooperating to form a torus chamber adapted to be filled with liquid, the stator and the rotor having cooperating inlets and outlets, the stator being arranged to receive liquid from the rotor outlet and to discharge the liquid into the rotor inlet and having vanes for reversing the absolute velocity of the liquid, the rotor having a vaned portion positioned adjacent the outlet for decelerating the liquid from maximum angular momentum to zero angular momentum and for accelerating the liquid from zero angular momentum to maximum angular momentum and having an unvaned portion adjacent the inlet.

11. A torque reaction device comprising, a stator having an inwardly opening inlet and outlet, a rotor within the stator having an outwardly opening inlet and outlet cooperating respectively with the outlet and inlet of the stator, the stator and rotor cooperating to form a torus chamber adapted to be filled with liquid, vanes in the rotor including curved vanes for accelerating the liquid to maximum angular momentum and for decelerating the liquid from maximum to zero angular momentum and for inducing a velocity head to cause flow of liquid in the torus chamber, vanes in the stator for receiving liquid from the rotor outlet and arranged to reverse the absolute velocity of the liquid and direct the same back into the rotor at its inlet, the vanes in the stator inlet having an angle which establishes the theoretical radial velocity of the liquid through the torus chamber, the rotor outlet having a radius greater than that of the rotor inlet to set up a centrifugal head for increasing the actual radial velocity to an extent which substantially offsets loss of velocity due to friction, so that the actual radial velocity substantially equals the theoretical velocity as established by the stator vanes whereby the liquid may enter the stator substantially without shock.

12. A torque reaction device comprising a stator and a rotor with inlets and outlets co-operating to form a torus chamber adapted to be filled with liquid, vanes in the rotor for inducing a velocity head to cause flow of liquid in the torus chamber, said vanes being arranged to accelerate the liquid to maximum angular momentum and to decelerate the liquid from maximum to zero angular momentum, vanes in the stator for receiving liquid from the rotor outlet and arranged to reverse the absolute velocity of the liquid and direct the liquid back into the rotor at its inlet, the vanes in the stator inlet having an angle which establishes the theoretical radial velocity of the liquid through the torus chamber, the rotor outlet having a radius greater than that of the rotor inlet and the differential being calculated to set up a centrifugal head which is converted into velocity head to an extent which substantially offsets loss of velocity due to friction so that the actual radial velocity substantially equals the theoretical velocity whereby the liquid may enter the stator substantially without shock.

13. A torque reaction device comprising a stator and a rotor cooperating to form a torus chamber adapted to be filled with liquid, the stator and rotor having cooperating inlets and outlets, vanes in rotor for accelerating the liquid to maximum angular momentum and for decelerating the liquid from maximum to zero angular momentum, vanes in the stator for receiving the liquid from the rotor outlet and arranged to reverse the absolute velocity and direct the liquid back into the rotor inlet, the vanes in the stator having an angle which establishes the theoretical radial velocity of liquid through the torus chamber, the tips of the stator vanes at their inlet having a slightly lesser angle merging into the major portion of the vanes for substantially shockless entry of the liquid into the stator at a radial velocity less than the theoretical incident to loss of velocity caused by friction.

14. A torque reaction device comprising a stator and a rotor cooperating to form a torus chamber adapted to be filled with liquid, the stator and the rotor having cooperating inlets and outlets, the stator being arranged to receive liquid from the rotor outlet and to discharge the liquid into the rotor inlet, and having vanes for reversing the absolute velocity of the liquid, the rotor having an unvaned portion and a vaned portion, the vaned portion providing guiding surfaces for the liquid, some of said surfaces being shaped to accelerate the liquid to maximum angular momentum for the discharge of the liquid from the rotor into the stator at maximum angular momentum, and some of the surfaces being shaped to decelerate the liquid from maximum angular momentum to substantially zero angular momentum after the liquid has been discharged from the stator back to the rotor, and the unvaned portion providing a channel for the torus flow.

ERNEST E. WEMP.